United States Patent [19]

Clancy

[11] 3,914,623

[45] Oct. 21, 1975

[54] WAVEFORM GENERATOR INCLUDING MEANS FOR AUTOMATIC SLOPE CALIBRATION

[75] Inventor: Steven John Clancy, Linthicum, Md.

[73] Assignee: Westinghouse Electric Corporation, Pittsburgh, Pa.

[22] Filed: Oct. 31, 1973

[21] Appl. No.: 411,495

[52] U.S. Cl. ................ 307/229; 307/228; 307/263; 328/181; 328/127; 343/7.3

[51] Int. Cl.[2] ....................... G06G 7/12; H03K 4/10

[58] Field of Search .................... 307/228, 229, 263; 328/181, 185, 127

[56] References Cited

UNITED STATES PATENTS

| | | | |
|---|---|---|---|
| 3,242,489 | 3/1966 | Leyde | 328/185 |
| 3,360,744 | 12/1967 | Blitz et al. | 328/185 |
| 3,439,282 | 4/1969 | Moriyaso | 307/228 |
| 3,493,961 | 2/1970 | Hansen | 307/228 |
| 3,610,952 | 10/1971 | Chandos | 307/228 |
| 3,757,099 | 9/1973 | Anderson | 307/229 |
| 3,778,794 | 12/1973 | Szabo et al. | 307/229 |

*Primary Examiner*—Stanley D. Miller, Jr.
*Attorney, Agent, or Firm*—R. M. Trepp

[57] ABSTRACT

In a waveform generator such as a sawtooth wave generator, automatic slope calibration is provided. A variable resistance element is feedback-responsive and provides an input voltage which affects waveform shape. The shape of the waveform is controlled automatically by a time error signal through the use of a feedback loop which controls the input voltage. In one embodiment, the feedback loop measures the time at which waveform voltage reaches a predetermined level and compares the time span it takes for the value of the waveform to reach the predetermined level to a preselected time span tò provide the time error signal. The time error signal is utilized in a closed loop to control the voltage supplied by the variable resistance element. In another embodiment, the feedback loop measures the voltage difference between a fixed reference and the generated waveform at a predetermined time to generate the time error signal and control the input voltage supplied from the variable resistance element.

25 Claims, 12 Drawing Figures

WAVEFORM GENERATOR INCLUDING MEANS FOR AUTOMATIC SLOPE CALIBRATION

BACKGROUND OF THE INVENTION

1. Field of the Invention

This invention relates to waveform generators, and more particularly to automatic calibration of waveform slope. The invention herein described was made in the course of or under a contract or subcontract with the Department of the Navy.

2. State of the Prior Art

Waveform generators, for example, sawtooth waveform generators are useful in many analog circuits. For example, they are used in analog range tracking loops in radar systems. In such applications precise and accurate voltage change versus time, i.e., the slope of the sawtooth waveform, is required. In a typical prior art sawtooth generator, an input voltage is applied to an operational amplifier connected as an integrator. Consequently, the slope of the sawtooth waveform input is a function of input voltage.

Normally, the input voltage is adjusted by means of a potentiometer. Of course, this is an open-loop adjustment, and the tolerances of the potentiometer thus affect the precision of the sawtooth waveform slope. Potentiometers are commonly subject to variation in value with change in temperature. Aging of components also affects their values, so that readjustment from time to time is necessary. The necessity for readjustment entails expense, decreases reliability, and of necessity means the equipment in which the sawtooth oscillator is placed must be taken out of use in order to make the adjustment. Adjustment of the potentiometer may also interact with other circuit adjustments.

It should be noted that while the present invention is discussed in terms of sawtooth wave generation, because it is likely that this is where the invention will find its widest application, the invention is applicable to other waveform generators in which it is desired to control accuracy and precision of voltage versus time.

OBJECTS AND SUMMARY OF THE INVENTION

It is therefore a general object of the present invention to provide a waveform generator including means for automatic adjustment of the slope of the waveform.

It is an object of the present invention to provide a waveform generator including means for automatic slope calibration responsive to feedback.

It is a more specific object of the present invention to provide automatic slope calibration in a sawtooth waveform generator.

It is also an object of the present invention to provide a waveform generator of the type described including a feedback loop in which both a time comparison and a voltage comparison are performed.

The waveform generator according to the present invention preferably comprises a means for generating an output signal waveform related to the amplitude of an input signal and a means operatively connected to the output signal generating means for providing the input signal thereto. The input signal from the input signal providing means is selectively controllable in amplitude in response to a control voltage. The output signal from the output signal generating means is utilized, in conjunction with a reference voltage, to produce a control voltage to control the amplitude of the input signal applied to the generating means. The reference voltage provides, in effect, an expected or reference voltage and the control voltage producing means provides a signal related in amplitude to a time difference between an actual and an expected amplitude of the generated output signal. The control voltage may then be applied to the input signal providing means to selectively control the time difference.

BRIEF DESCRIPTION OF THE DRAWINGS

The means by which the foregoing objects and features of novelty are achieved are pointed out with particularity in the claims forming the concluding portion of the specification. The invention, both as to its organization and manner of operation, may be further understood by reference to the following description taken in connection with the following drawings in which:

DESCRIPTION OF THE PREFERRED EMBODIMENTS

Figure 1:
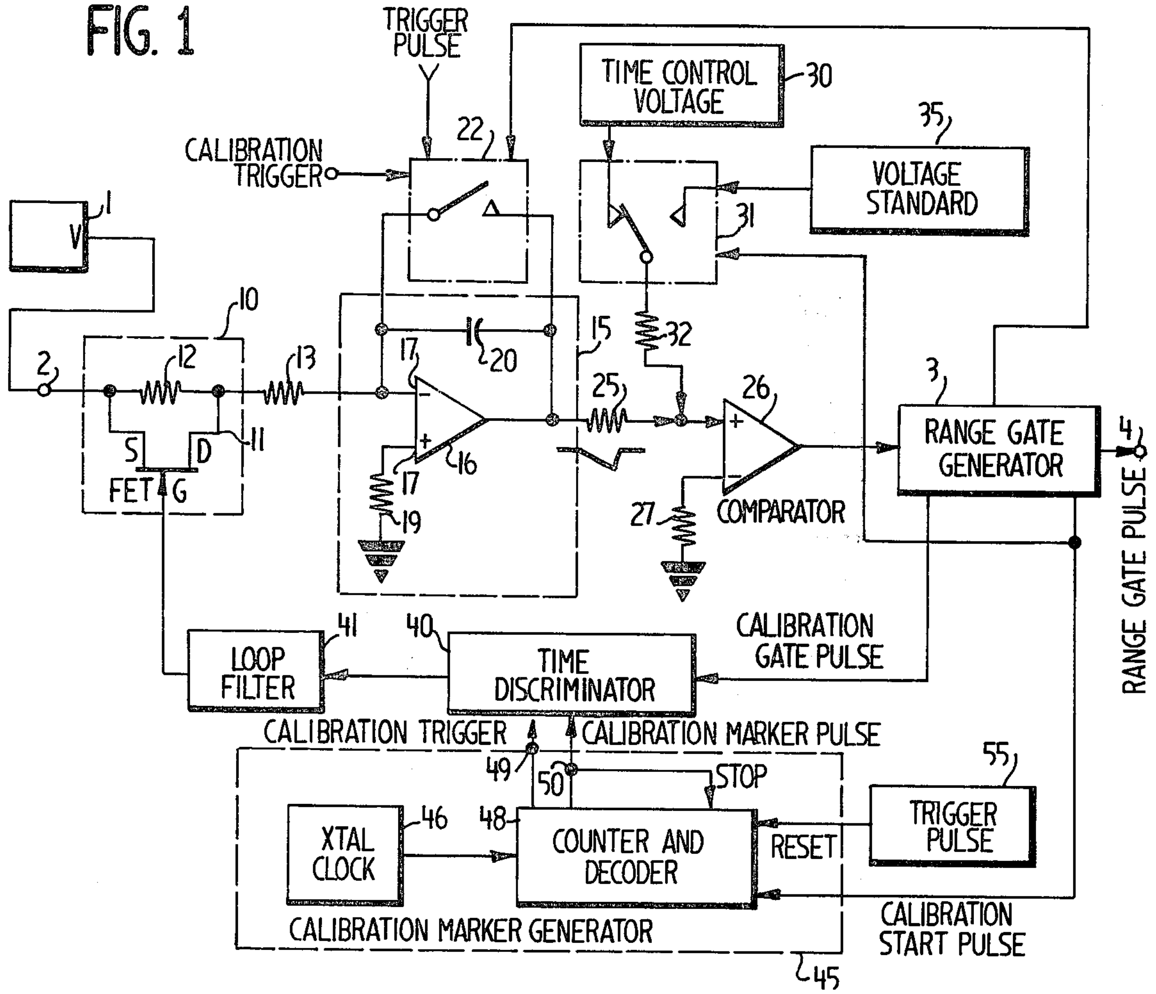
FIG. 1 is a schematic diagram of a waveform generator constructed in accordance with the present invention connected for controlling the production of a range gate pulse in a radar system and which is a preferred means of providing waveforms of selectable variable duration.

Referring now to FIG. 1, there is illustrated a range gate generator for connection in a radar system and including a waveform generator constructed in accordance with the present invention.

The waveform generator of the present invention provides a sawtooth waveform output. A sawtooth waveform may be described as having an absolute value increasing linearly with time. Therefore the waveform may be compared to a voltage standard and to a time standard in order to provide an error voltage for calibration of input voltage of which waveform voltage is a function. In the embodiment of FIG. 1, the waveform generator of the present invention is illustrated in the environment of a radar range gate generator. A precise voltage waveform must be supplied in order to accomplish the precise time required for generation of a radar range gate.

Referring now to FIG. 1, there is illustrated a source of input voltage 1 connected to an input terminal 2 in order to supply the circuit constructed in accordance with the present invention. The circuit produces a sawtooth waveform which triggers a range gate generator 3 providing an output pulse at an output terminal 4 for connection to utilization means (not shown).

In accordance with the present invention a slope modulator 10 is provided which includes a variable resistance device 11. In the present embodiment, the variable resistance device 11 comprises a field effect transistor. Other variable resistance devices known in the art may be utilized. In the present embodiment, the source electrode of the field effect transistor 11 is connected to the input terminal 2 and the drain electrode provides the output terminal of the slope modulator 10. A resistor 12 is connected between the source and drain electrodes of the field effect transistor 11. The output signal from the slope modulator 10 is coupled by a resistor 13 to an integrator 15. In the present embodiment, the integrator 15 comprises an operational amplifier 16 having a subtracting input terminal 17 connected to the resistor 13 and adding an input terminal 18 coupled by a resistor 19 to ground. A capacitor 20 is connected from the output terminal of the operational amplifier 16 to its input terminal 17. A reset switch 22 is provided across the capacitor 20 for resetting the integrator 15 in accordance with timing inputs from synchronization means described below.

The output signal from the integrator 15, which provides the sawtooth waveform, is coupled by a resistor 25 to a comparator 26. The comparator 26 in the present embodiment comprises an operational amplifier having a summing input terminal connected to the resistor 25 and a subtracting input terminal coupled by a resistor 27 to ground. The comparator 26 compares the output signal of the integrator 15, in a first mode, to the output signal from a time control voltage source 30 and, in a second mode, to the output signal from a voltage standard 35. The comparator 26 thereby provides an output signal to the gate generator 3 for provision of a range gate pulse. In order to provide the desired range gate pulse, the input signal to the comparator 26 must have a given voltage level at an appropriate time in accordance with well-known radar operation.

In accordance with the present invention, both time and voltage comparisons are performed in order to provide an error voltage at the control or gate electrode of the slope modulator 11 The time control voltage source 30 and the voltage standard 35 are provided for coupling into the loop by a suitable electronic switching means 31. The output of the switching means 31 is connected in the loop of the present circuit by a resistor 32 coupled between the output of the switching means 31 and the junction of the resistor 25 and comparator 26 summing input terminal. The switching means 31 is controlled by synchronization means, in the present embodiment the gate generator 3, to selectively connect the resistor 32 to the time control voltage source 30 or to the voltage standard 35.

Since the output level of the integrator 15 is time dependent, and the voltage standard 35 determines a predetermined level, the voltage standard 35 is connected to determine the time at which a predetermined level is reached by the output signal from the integrator 15.

Timing control is provided in the following manner. Time comparison means in the form of a time discriminator 40 is connected in series with a loop filter 41 and the output signal from the filter 41 is applied to the gate electrode of the slope modulator 10. A calibration gate pulse from the range gate generator 3 is applied to one input terminal of the time discriminator 40. The time discriminator is a well-known component in the art and is analogous to a phase detector. More specifically, the output signal from the time discriminator 40, which may be referred to as the time error output signal is proportional to the time difference between the calibration gate pulse from the gate generator 3 and an input signal from a calibration marker generator 45. The loop filter 41 is also well-known in the art and filters out alternating current components from the output signal of the time discriminator 40 and, due to the capacitive nature of filtering circuitry, holds the output voltage of the time discriminator 40 to a selectable degree.

The calibration marker generator 45 includes a crystal clock 46, the output signal from which is applied to a counter and decoder 48. The counter and decoder 48 provides a calibration trigger at an output terminal 49 which is connected to the switch 22. The counter and decoder 48 provides a calibration marker pulse from an output terminal 50 to the time discriminator 40. The output signal from the output terminal 40 is also applied to a STOP input terminal of the counter and decoder 48 so that the counter 48 will stop counting after reaching a predetermined count. A further timing input signal for synchronizing the operation of the present circuit by resetting the counter and decoder 48 is provided from a trigger pulse source 55. A calibration start pulse from the gate generator 3 may start the counter and decoder 48. The trigger pulse source 55 is contained in radar circuitry in the utilization means (not shown), is used for resetting the present circuit and provides outputs to the counter and decoder 48 and the switch 22. The range gate generator 3 provides the calibration start pulse to the counter and decoder 48 and the switch 22 for synchronizing operation an any suitable manner.

OPERATION

Figures 2A, 2B, 2C, 2D, 2E, 2F:
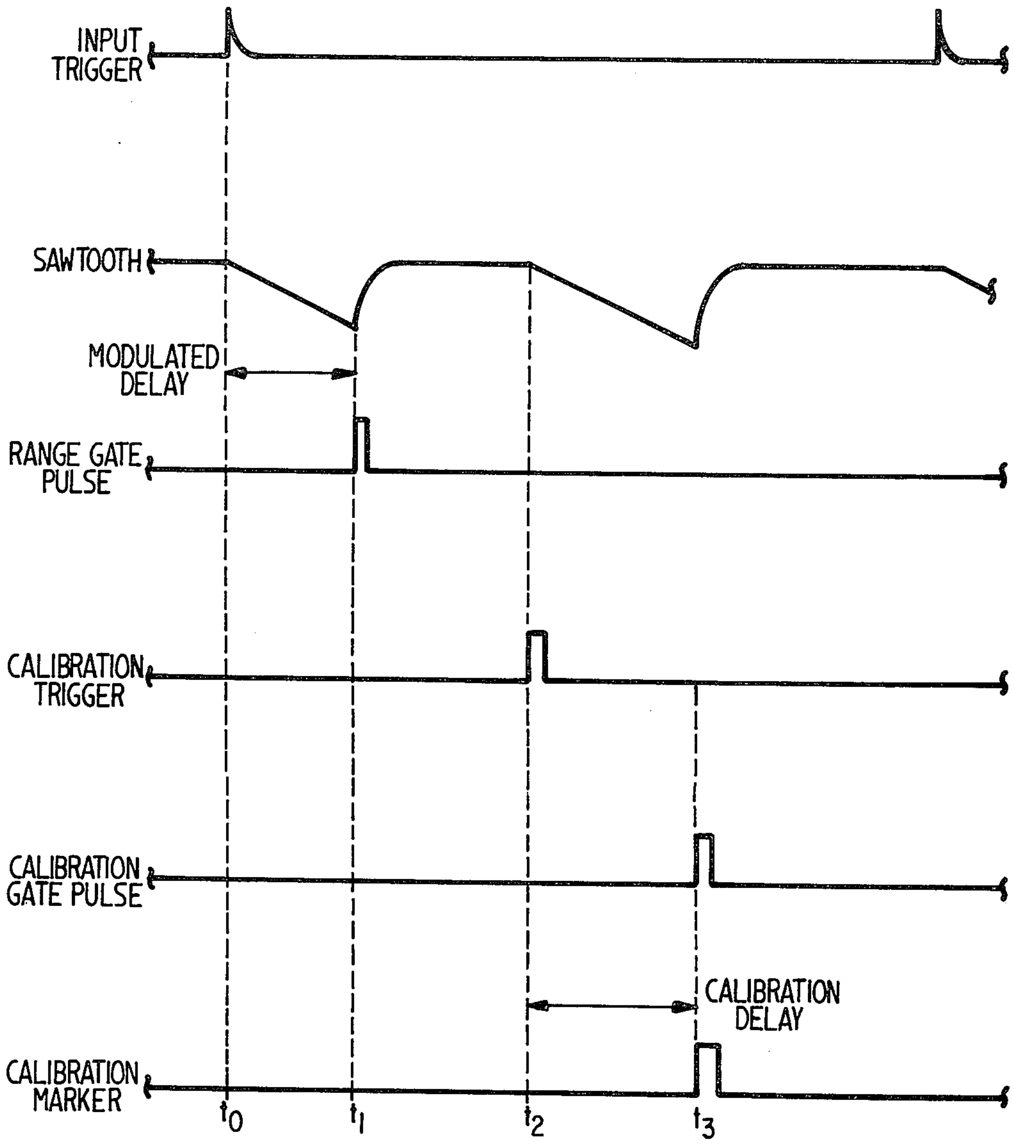
FIG. 2 is a timing chart useful in understanding in the operation of the circuit of FIG. 1.

Operation of the embodiment of FIG. 1 is described with respect to FIG. 2 in which FIG. **2*a* is a representation of input trigger voltage; FIG. 2*b* is a representation of sawtooth waveforms produced by the integrator 15; FIG. 2*c* represents the output signal at the output terminal 4 comprising the range gate pulse; FIG. 2*d* is illustrative of the calibration trigger pulse provided by the counter and decoder 48; FIG. 2*e* is indicative of the calibration gate pulse; and in FIG. 2*f* the calibration marker pulse produced by the counter and decoder 48 and supplied to the time discriminator 40** is illustrated.

The inputs to the circuit of FIG. 1 are the trigger pulse of FIG. **2*a*, the time control voltage produded by the source 30 which is a dc level voltage, and the calibration standard voltage provided by the voltage standard 35. Commencement of the operation of the circuit is selected for purposes of the present description as to the provision of the trigger pulse illustrated in FIG. 2a at time $t_0$. At this time, it may be said that the radar system has initiated the generation of a range pulse. The capacitor 20 is fully discharged by the closed switch 22 and the trigger pulse from the trigger pulse generator 55 opens the switch 22 at time $t_0$ so that generation of a new sawtooth waveform at the output of the integrator 15 may begin. Additionally, the trigger pulse provided from the source 55 resets the counter and decoder 48** so that a new count to provide a time standard is begun.

The voltage supplied to the terminal 17 of the integrator 15 causes production of a sawtooth waveform at the output of the integrator 15 in a well-known fashion. The switch 31 connects the time control voltage source 30 to the comparator 26 for operation in a first mode. The comparator 26 senses when the sawtooth voltage is equal to the voltage provided by the time control voltage source 30. In the present embodiment, a negative-going sawtooth waveform is provided. This is illustrated in FIG. **2*b*. When the appropriate value of the sawtooth waveform is reached at time $t_1$, an appropriate output signal from the comparator 26 triggers the range gate generator 3 and the range gate pulse (FIG. 2C) is provided. The range gate generator 3 provides the range gate pulse at the output terminal 4 and the calibration start pulse may be simultaneously applied to the counter and decoder 48 to start the counter. Also at time $t_1$, the range gate generator 3 provides an output signal, e.g., the calibration start pulse, to switch the switching means 31 to connect the voltage standard 35 to the input of the comparator 26. The purpose of connecting the voltage standard to the summing input terminal of the comparator 26 is to provide a calibration cycle, or second mode, whereby the slope provided by the slope modulator 10** is set for a standard voltage to enable the circuit to provide the proper slope in response to the time control voltage when operating in the first mode.

In the calibration mode, the calibration trigger is generated in response to decoding a predetermined count to trigger the solid state switch 22 and thus reset the integrator 15 at time $t_2$ to begin the production of the second sawtooth waveform of FIG. 2*b* and begin the calibration cycle. The period of time between generation of the range gate and the calibration trigger may be selected as desired.

In response to voltage provided from the slope modulator 11, the integrator 15 provides the waveform of FIG. 2*b* beginning at time $t_2$, in order to provide a voltage comparison. When the appropriate voltage relationship exists between the signal from the voltage standard 35 and the calibration sawtooth waveform, the calibration gate pulse is generated by the gate generator 3. The exact time of successful voltage comparison between the sawtooth wave and the standard voltage is thus indicated by the calibration gate pulse.

In order to provide a time comparison, the counter and decoder 48 continues counting up to a predetermined count and reaches a predetermined count at time $t_3$ to provide a calibration marker pulse (FIG. 2f). The time determined by this count, i.e., the time period from time $t_2$ to time $t_3$, is the calibration delay. This calibration delay represents the time period over which the sawtooth waveform should have reached a voltage of sufficient magnitude to trigger the gate generator 3. The time discriminator 40 compares the time at which the calibration marker pulse is provided to the time at which the calibration gate pulse is generated. If there is a time difference between these two signals, the time discriminator 40 provides an output signal filtered by the loop filter 41 to the slope modulator 10 and, more specifically, to the gate of the field effect transistor 11, to null time errors between the calibration marker pulse provided by the calibration marker generator 45 (FIG. 2f) and the calibration gate pulse provided by the range gate generator 3 (FIG. 2*e*). In other words, the occurrence of the calibration gate pulse is forced to occur at time $t_3$.

Of course it may take one or more operating cycles for this to occur. However, for purposes of the present exemplifications, the pulse of FIG. 2*e* is illustrated as occurring at time $t_3$.

An output signal from the range gate generator 3 again switches the switching means 31 so that the selectable time control voltage 30 is connected to the summing input terminal of the comparator 26 and the system is enabled to respond to the next trigger pulse to provide an output signal in the first mode as previously described. In summary, the voltage comparison provided by the voltage standard 35 assures that a proper voltage level is provided after a certain time span and the comparison provided by the time discriminator 40 assures that the desired voltage level is reached at the right time. By determining the exact time at which a desired voltage level is provided, precise slope control is provided. Therefore, the time control source may be utilized to determine the time it will take to produce a range gate pulse at the output terminal for selecting the level of the dc input voltage. This is particularly useful in the context of radar applications since small time differences can make large differences in the distance of range cells to which a radar system is responsive.

FIG. 3 EMBODIMENT

Figure 3:
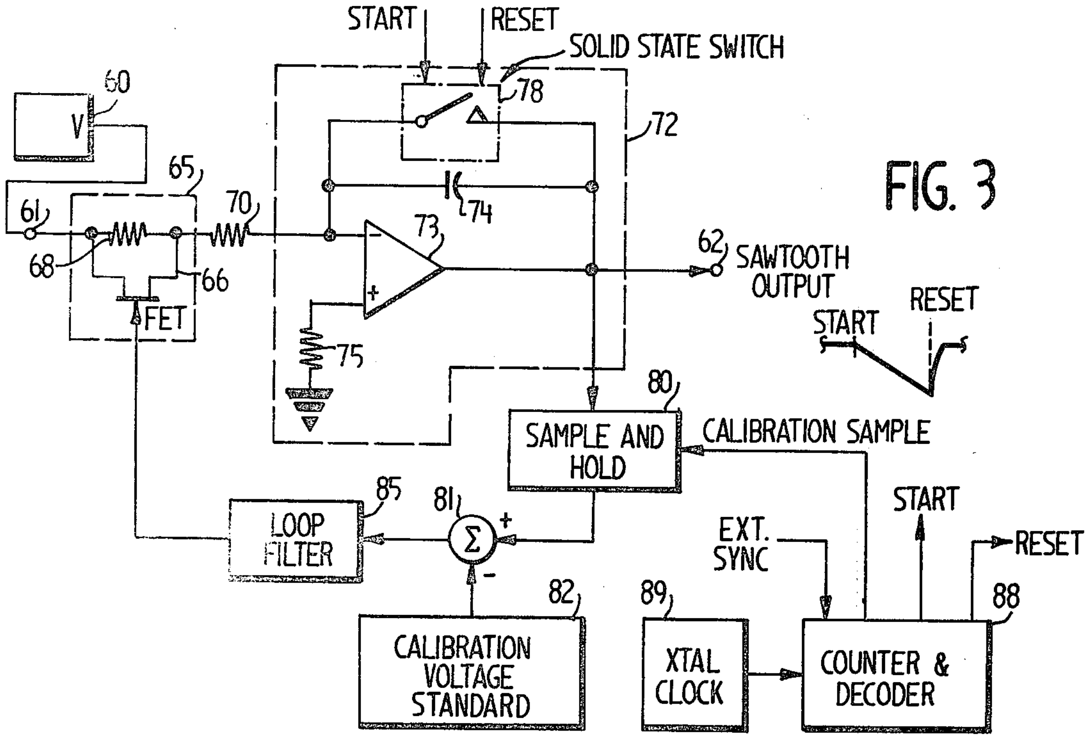
FIG. 3 is a schematic representation of another form of the present invention which is preferred for providing a fixed duration waveform; and, FIG. 4 is a timing chart useful in understanding the operation of the circuit of FIG. 3.

In FIG. 3 there is illustrated another embodiment of the present invention providing both time and voltage comparison which is preferred in applications where it is desied to provide a sawtooth waveform of constant time duration in reaching a predetermined, fixed magnitude. In FIG. 3, a voltage source 60 is provided at an input terminal 61 in order than an output waveform related thereto may be provided at an output terminal 62. A voltage controllable slope modulator 45 comprising a variable resistance voltage responsive device 66 such as a field effect transistor in the present embodiment is provided. The field effect transistor 66 has its source electrode connected to the input terminal 61 and the drain electrode of the field effect transistor 66 may provide an output terminal of the slope modulator 65. The gate electrode of the field effect transistor 66 may function as a control terminal of the slope modulator 65 and a resistor 68 may be connected between the source and drain electrodes of the field effect transistor 66.

The output signal of the slope modulator 65 is coupled by a resistor 70 to an integrator 72 comprising an operational amplifier 73 having a capacitor 74 connected from its output terminal to its subtracting input terminal. The adding or summing input terminal of the operational amplifier 73 is coupled by a resistor 75 to ground. A reset switch 78 operating in a manner similar to the reset switch 22 of FIG. 1 is connected across the capacitor 74. The output signal from the integrator 72 is provided at the output terminal 62 and is applied to an input terminal of a sample and hold circuit 80. The output signal from the sample and hold circuit 80 is connected to an adding input terminal of a summing circuit 81 having a subtracting input terminal coupled to a calibration voltage standard 82 for provision of a voltage comparison. The output signal from the summing circuit 81 is applied through a loop filter 85 which provides an output voltage to the control terminal of the slope modulator 65, namely the gate electrode of the field effect transistor 66. The rate of rise of the value of the output signal of the integrator 72 is responsive to the magnitude of the output signal of the calibration voltage standard 82. Therefore, it may be said that the calibration voltage standard 82 determines the time at which the output signal of the integrator 72 reaches a predetermined level.

Timing is provided by a counter and decoder 88 preferably synchronized by a crystal clock 89 and coupled to provide a calibration sample input to the sample and hold circuit 80. An external synchronization signal may be provided to the counter and decoder 88. The counter and decoder 88 also provides start and reset output signals for application to the solid state switch 78, as illustrated.

OPERATION

The integrator 72 provides a sawtooth waveform which is a function of the integral of the value of the voltage provided by the slope modulator 65. The output voltage of the integrator 72 is sampled and held by the circuit 80 and compared to the voltage provided by the calibration voltage standard 82 providing a difference output signal. The difference output signal is filtered by the loop filter 85 and used to modulate the resistance of the field effect transistor 66 in the same manner as the resistance of the field effect transistor 11 is modulated in the embodiment of FIG. 1.

Figures 4A, 4B, 4C, 4D:
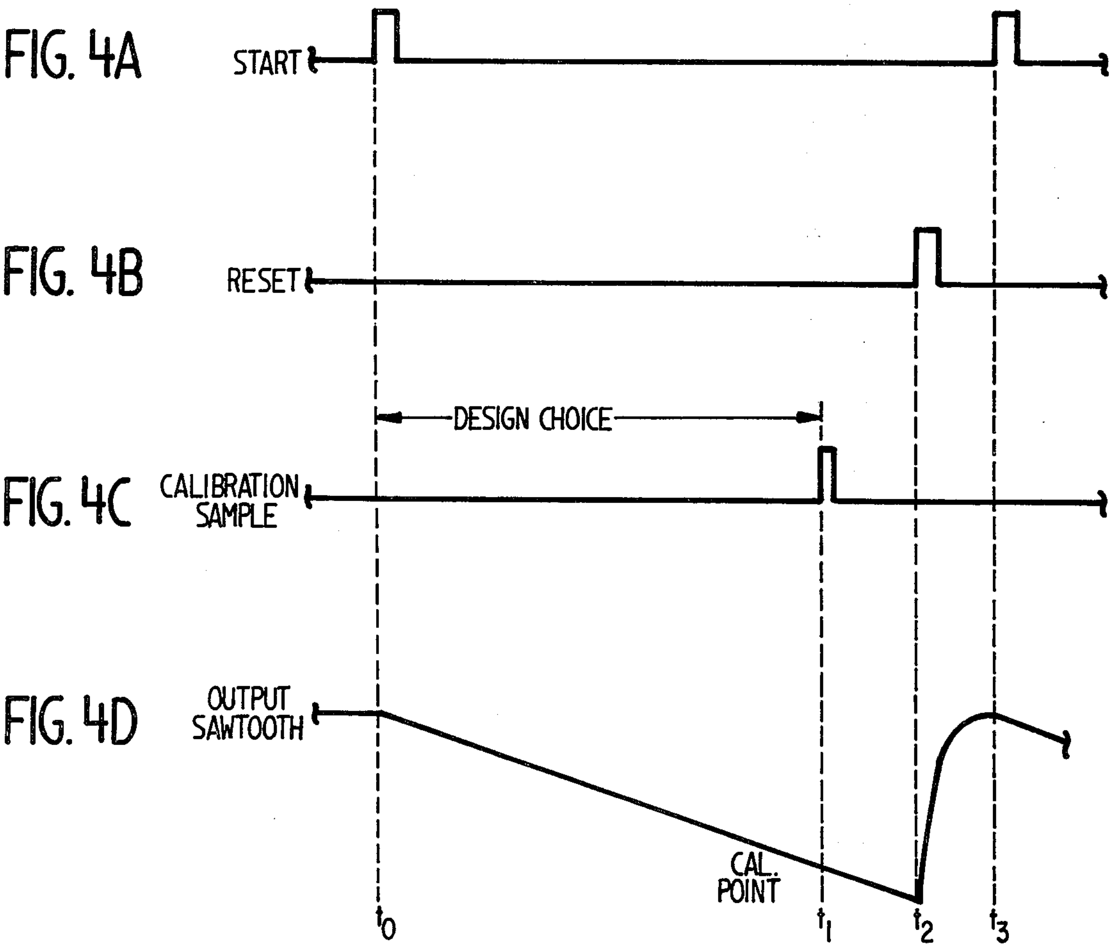

The time comparison is described with respect to FIG. 4 in which FIG. 4*a* represents start pulses provided by the counter and decoder 88; FIG. 4*b* is illustrative of reset pulses provided by the counter and decoder 88; and FIG. 4*c* the calibration sample pulse provided from the counter and decoder 88 to the sample and hold circuit is illustrated; and in FIg. 4*d*, the output sawtooth waveform provided at the output terminal 62 is shown.

At a predetermined time, which may be determined by the external synchronization input, the counter and decoder 88 provides a start pulse (FIG. 4*a*) at time $t_0$ to assure that the capacitor 74 is discharged for the beginning of an operating cycle. Responsive to the output signal from the slope modulator 65, the integrator 72 begins production of the sawtooth waveform (FIG. 4*d*). The counter and decoder begins counting to produce a calibration sample pulse at a predetermined time $t_1$ during the production of the output sawtooth waveform. The calibration sample pulse is provided at time $t_1$ which occurs at a predetermined time after $t_0$ and before the end of the operating cycle as a matter of design choice. $T_1$ is referred to as the calibration point.

The output signal from the sample and hold circuit 80 is compared to the output signal from the calibration voltage standard 82 to provide the time error output signal. The time error output of the summing circuit 81 is a function of the difference in the times at which the calibration sample is provided and the output of the integrator 72 reaches the voltage that should correspond to the calibration point when the desired slope is provided. This time error output signal is filtered provided to modulate the slope produced by the slope modulator 65.

The magnitude of the output signal of the calibration voltage standard 82 determines the magnitude of the output signal of the summing circuit 81, and hence the input signal to the field effect transistor 66. At time $t_2$, which is a preselected time corresponding to the selected length of the sawtooth waveform, the counter and decoder provides a reset pulse (FIG. 2*b*) closing the switch 78 until time $t_3$, which corresponds to time $t_0$ of a next operating cycle.

In summary, the sample and hold circuit 80 samples the amplitude of the sawtooth waveform from the integrator 72 at a predetermined time $t_1$. At this time $t_1$ the sawtooth waveform amplitude should be equal to the voltage from the calibration voltage standard 82. If these signals are not equal in value, the summing circuit 81 generates an error signal which modulates the slope of the sawtooth waveform through the control of the slope modulator 65. After one or more cycles, the slope of the sawtooth waveform is thus automatically calibrated and retained at the desired slope.

The inventive concept described above may be incorporated in many other forms of circuits. For example, the particular form of feedback technique disclosed may be applied to other sawtooth generators utilizing a constant current source driving a capacitive integrator or a constant voltage source driving an inductive integrator. In order to provide a sawtooth waveform, capacitive or inductive components should be linear with voltage. However, if it is desired that non-linear components be used, the present circuit may still be utilized to provide desired time and voltage relationship.

While an integrator 15 and 72 have been shown, the invention may be utilized with other voltage (or current) responsive waveform generating means. Other waveforms may be produced which may be measures by a time comparison and a voltage comparison.

While the embodiments of the present exemplification each perform one time comparison and one voltage comparison, further comparisons necessary to describe polynomial curves may be provided. Thus the term integrator in the present description may be taken broadly to mean voltage (or current) responsive waveform generator. What is thus provided is a waveform generator providing precise slope control at continuous calibration. Precise performance is provided with lower maintenance and higher reliability than manually calibrated circuits.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a waveform generator including an integrator for providing an output voltage which is a function of time, the improvement comprising: a feedback-responsive variable resistance device connected to provide an input signal to said integrator, comparator means coupled to the output of said integrator for providing an output signal in response to the output signal level of said integrator attaining a predetermined level, a voltage standard coupled to said comparator means to determine the time when the output of said integrator reaches the predetermined level, time comparison means coupled to said comparator means for comparing the time span for the output of said integrator to reach the predetermined voltage level to a preselected time span and for providing a time error output indicative of the difference therebetween, and means coupling the error output in a closed loop to a control terminal of said feedback-responsive variable resistance means, whereby said feedback-responsive variable resistance means varies the input voltage to said integrator, said time error output is nulled, and waveform slope is automatically controlled.

2. The improvement according to claim 1 in which said feedback-responsive variable resistance device comprises a field effect transistor.

3. The improvement according to claim 1 wherein said comparator means comprises a comparator operatively connected to the output of said integrator and to said voltage standard, said comparator providing an output when the output voltage provided by said integrator equals the voltage provided by said voltage standard, said comparator means further comprising a pulse generator connected to the output of said comparator for providing a pulse when said comparator provides an output.

4. The improvement according to claim 3 wherein said time comparison means comprises a time discriminator operatively connected to said pulse generator and having an output coupled to said feedback-responsive variable resistance means, and further comprises a counter and decoder responsive to the beginning of an operating cycle of said integrator and providing an output pulse after a predetermined time, said output pulse being connected to said time discriminator, and said time discriminator providing an output indicative of the time difference between the output of said pulse generator and the output of said counter.

5. The improvement according to claim 4 further comprising a time control voltage source for comparison to the output of said integrator, switching means coupled for selectively coupling said time control voltage source or said voltage standard to said comparator, and synchronization means coupled to operate said switching means, said synchronization means being operable to initiate a first mode in which an output pulse is produced in response to comparison of the time control voltage to the output of said integrator and a second mode in which said voltage standard is connected to be compared to the output of said integrator whereby a calibration cycle is provided.

6. The improvement according to claim 5 in which said feedback-responsive variable resistance device comprises a field effect transistor.

7. A sawtooth waveform generator comprising, in combination:

a. a slope modulator comprising a feedback-responsive variable resistance device having an input for connection to a source of voltage;
b. an integrator connected to the output of said slope modulator;
c. a sample and hold circuit connected to the output of said integrator;
d. a calibration voltage standard;
e. a summing circuit for comparing the output of said sample and hold circuit to said calibration voltage standard and providing an output indicative of the difference therebetween, the output of said summing circuit being connected to said slope modulator;
f. a counter and decoder providing a calibration sample a predetermined time after beginning of generation of an output waveform by said integrator; and,
g. synchronizing means coupled so that said counter begins counting and said integrator begins producing an output waveform at the same time, whereby slope error of the output of said integrator may be determined and corrected automatically.

8. The circuit according to claim 7 wherein said slope modulator comprises a field effect transistor.

9. A waveform generator comprising:

means for generating an output signal waveform related to the amplitude of an input signal;
means operatively connected to said output signal generating means for supplying an input signal thereto, said input signal being selectively modulated in amplitude by said input signal supplying means in response to a control voltage;
means for supplying a level reference signal having a predetermined amplitude;
means for supplying a time reference signal indicative of a predetermined time period from a predetermined point in said output signal waveform;
means responsive to said time reference signal, to the output signal from said generating means and to said level reference signal for producing a control voltage to control the amplitude of said input signal supplied to said generating means from said input signal supplying means, the control voltage being related in amplitude to a time difference between an actual and an expected incidence of the generated output signal attaining the amplitude of the level reference signal, said control voltage being applied to said input signal providing means to selectively control said time difference.

10. The waveform generator of claim 9 wherein said control voltage generating means comprises:

sample and hold circuit means for sampling and holding the voltage level of the output signal waveform from said generating means at a time determined by said time reference signal;
means for comparing said voltage level from said sample and hold circuit means to said level reference signal and for generating a difference signal related to the difference in levels between said voltage level and said level reference signal, said difference signal being provided as said control voltage to said input supplying means.

11. The waveform generator of claim 10 wherein said input supplying means comprises a source of an input voltage and a feedback-responsive, variable resistance device, said input voltage being applied to said generating means through said variable resistance device and said control voltage controlling the resistance of said variable resistance device.

12. The waveform generator of claim 11 wherein said variable resistance device comprises a field effect transistor.

13. The waveform generator of claim 10 wherein said output signal waveform generating means comprises integrating means for integrating said input signal from said input signal supplying means at a predetermined linear rate.

14. The waveform generator of claim 13 wherein said time reference signal supplying means comprises a source of clock pulses and means for counting said clock pulses and for decoding the count in said counting means to provide said time reference signal in response to the number of clock pulses counted, said counting and decoding means supplying a start signal to said integrating means to commence the generation of said sawtooth waveform and supplying a sample signal to said sample and hold circuit means at the end of said predetermined time period from said start signal.

15. The waveform generator of claim 9 wherein said control voltage generating means comprises:

means for comparing the voltage level of said output signal waveform to said level reference signal and for generating a trigger signal in response to a predetermined voltage level relationship therebetween; and, means responsive to said comparing means and to said time reference signal supplying means for generating a control signal related to a time difference between the occurrence of said trigger signal and the occurrence of said time reference signal, said control signal being supplied to said input supplying means to provide said control voltage.

16. The waveform generator of claim 15 wherein said input supplying means comprises a source of an input voltage and a feedback-responsive, variable resistance device, said input voltage being applied to said generating means through said variable resistance device and said control voltage controlling the resistance of said variable resistance device.

17. The waveform generator of claim 16 wherein said variable resistance device comprises a field effect transistor.

18. The waveform generator of claim 15 wherein said output signal waveform generating means comprises integrating means for integrating said input signal supplying means at a predetermined linear rate.

19. The waveform generator of claim 9 wherein said input supplying means comprises a source of an input voltage and a feedback-responsive, variable resistance device, said input voltage being applied to said generating means through said variable resistance device and said control voltage controlling the resistance of said variable resistance device.

20. The waveform generator of claim 19 wherein said variable resistance device comprises a field effect transistor.

21. The waveform generator of claim 15 wherein said means for generating a control signal comprises:

a time discriminator coupled to said comparing means and to said reference signal supplying means; and, a loop filter connected in series with said time discriminator, said loop filter providing a level voltage control signal related to a time difference between the occurrence of said trigger signal and the occurrence of said time reference signal.

22. The waveform generator of claim 9 wherein said means for producing a control voltage comprises:

a comparator connected to said means for generating an output waveform and coupled to said means for supplying a level reference signal, said comparator providing an output when the output voltage provided by said means for generating an output waveform equals the signal provided by said means for supplying a level reference signal;

a pulse generator connected to the output of said comparator for providing a pulse when said comparator provides an output;

a time comparison means responsive to said time reference signal and responsive to said output of said comparator for providing a control voltage related to a time difference between an actual and an expected incidence of the generated output signal attaining the amplitude of the level reference signal.

23. The waveform generator of claim 22 further comprising:

a time control voltage source for comparison to said output signal waveform of said means for generating an output signal waveform;

switching means coupled for selectively coupling said time control voltage source or said means for supplying a level reference signal to said means for producing a control voltage; and, synchronization means coupled to said switching means for operating said switching means, said synchronization means being operable to initiate a first mode in which an output pulse is produced by said pulse generator in response to comparison by said comparator of said time control voltage source with the output of said means for generating an output signal waveform, and a second mode in which said means for supplying a level reference signal is connected to be compared with the output of said means for generating an output signal waveform;

whereby, a calibration cycle is provided.

24. The waveform generator of claim 23 wherein said synchronization means is operable to initiate said first mode and said second mode of operation during different complete periods of the output waveform provided by said means for generating an output signal waveform.

25. The waveform generator of claim 10 wherein said control voltage generating means further comprises:

a loop filter connected in series with said means for comparing the voltage level from said sample and hold circuit to said level reference signal, said loop filter providing a level voltage control signal related to a time difference between an actual and an expected incidence of the generated output signal attaining the amplitude of the level reference signal.

* * * * *